(12) United States Patent
Walsh et al.

(10) Patent No.: US 10,947,878 B2
(45) Date of Patent: Mar. 16, 2021

(54) METHOD OF CONTROLLING A REGENERATION PROCEDURE ON A VEHICLE

(71) Applicant: JAGUAR LAND ROVER LIMITED, Coventry (GB)

(72) Inventors: Joseph Walsh, Warwickshire (GB); Simon Message, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 46 days.

(21) Appl. No.: 16/485,302

(22) PCT Filed: Jan. 31, 2018

(86) PCT No.: PCT/EP2018/052332
§ 371 (c)(1),
(2) Date: Aug. 12, 2019

(87) PCT Pub. No.: WO2018/149636
PCT Pub. Date: Aug. 23, 2018

(65) Prior Publication Data
US 2019/0376423 A1    Dec. 12, 2019

(30) Foreign Application Priority Data
Feb. 15, 2017  (GB) .................................. 1702416.7

(51) Int. Cl.
*F01N 3/02*      (2006.01)
*F01N 3/08*      (2006.01)
*F01N 9/00*      (2006.01)
*F02D 41/02*     (2006.01)
*F01N 3/023*     (2006.01)

(52) U.S. Cl.
CPC ............. *F01N 3/023* (2013.01); *F01N 9/007* (2013.01); *F01N 3/0871* (2013.01);
(Continued)

(58) Field of Classification Search
CPC .......... F01N 9/002; F01N 9/007; F01N 3/023; F01N 3/0871; F01N 3/0885;
(Continued)

(56) References Cited

U.S. PATENT DOCUMENTS 9,551,258 B2 * 1/2017 Argolini ................. F01N 3/0233
2005/0166580 A1 * 8/2005 Pfaeffle .................... F01N 9/002
60/295

(Continued)

FOREIGN PATENT DOCUMENTS

DE   102007027182   12/2008
DE   102015212626   1/2017
(Continued)

OTHER PUBLICATIONS

Search and Examination Report, GB1702416.7, dated Jun. 9, 2017.
(Continued)

*Primary Examiner* — Audrey K Bradley
*Assistant Examiner* — Dapinder Singh
(74) *Attorney, Agent, or Firm* — Miller Nash Graham & Dunn LLP

(57) ABSTRACT

A method for controlling a regeneration procedure in an exhaust system after treatment device in a vehicle, the method comprising: determining a location of the vehicle, obtaining data related to the location, determining, based on the data related to the location a probability of completing the regeneration procedure on the vehicle at said determined location, controlling the vehicle to perform the regeneration procedure in dependence on the probability of completing the regeneration procedure.

15 Claims, 6 Drawing Sheets

(52) U.S. Cl.
CPC ........ *F01N 2900/12* (2013.01); *F02D 41/029* (2013.01); *F02D 2200/0812* (2013.01); *F02D 2200/702* (2013.01)

(58) Field of Classification Search
CPC ........... F01N 2900/102; F01N 2900/12; F02D 41/027; F02D 41/029; F02D 2200/0812; F02D 2200/701; F02D 2200/702; Y02T 10/40
USPC .................. 60/274, 277, 286, 295, 297, 311
See application file for complete search history.

(56) References Cited

U.S. PATENT DOCUMENTS

| | | | |
|---|---|---|---|
| 2007/0219682 A1* | 9/2007 | Kumar | B61L 27/0027 701/19 |
| 2008/0178576 A1* | 7/2008 | Meier | F01N 13/011 60/277 |
| 2009/0171549 A1* | 7/2009 | Hyde | F01N 9/00 701/102 |
| 2010/0109911 A1 | 5/2010 | Vosz | |
| 2012/0167555 A1 | 7/2012 | Frazier | |

FOREIGN PATENT DOCUMENTS

| | | |
|---|---|---|
| GB | 2479196 | 10/2011 |
| GB | 2524112 | 9/2015 |
| JP | 2003314250 | 11/2013 |
| WO | 2017005417 | 1/2017 |

OTHER PUBLICATIONS

Search and Examination Report, GB1801547.9, dated Jul. 30, 2018.
International Search Report and Written Opinion, PCT/EP2018/052332, dated Mar. 28, 2018.

* cited by examiner

METHOD OF CONTROLLING A REGENERATION PROCEDURE ON A VEHICLE

CROSS-REFERENCE TO RELATED APPLICATIONS

This application is a 371 of International Application No. PCT/EP2018/052332, filed Jan. 31, 2017, which claims priority to GB Patent Application 1702416.7, filed Feb. 15, 2017, the contents of both of which are incorporated by reference herein in their entirety.

TECHNICAL FIELD

The present disclosure relates to a method of controlling a regeneration procedure on a vehicle, particularly but not exclusively to the control of an aftertreatment device for an exhaust system of the vehicle. Aspects of the invention relate to a method, to a control system and to a vehicle.

BACKGROUND

Many vehicle systems require intermittent maintenance in order to ensure that they are kept operating in an efficient manner. An example of such a system is an aftertreatment device within an engine exhaust system. Over time the aftertreatment device may become saturated with undesirable exhaust gas species, for example particulates and oxides of nitrogen extracted from emissions from the vehicle's engine, which prevents the device from operating efficiently. To remove the built up undesirable exhaust gas species from the aftertreatment device, the vehicle must perform a regeneration procedure on the device.

Intermittent maintenance procedures such as the above noted regeneration procedure require the vehicle to operate in sub-optimal conditions for a short period of time. It is therefore desirable to ensure that intermittent maintenance procedures complete successfully and are not aborted prior to completion.

Currently, intermittent maintenance procedures on vehicles are typically only performed when the vehicle requires the maintenance, and external factors that may prevent the maintenance procedure completing are not considered. As a result vehicles often waste fuel through aborting intermittent maintenance procedures.

It is an aim of the present invention to address disadvantages associated with the prior art.

SUMMARY OF THE INVENTION

Aspects and embodiments of the invention provide a method, to a control system and to a vehicle as claimed in the appended claims.

According to an aspect of the present invention there is provided a method for controlling a regeneration procedure in an exhaust system aftertreatment device in a vehicle, the method comprising: determining a location of the vehicle; obtaining data related to the location of the vehicle; determining, based on the data related to the location, a probability of completing the regeneration procedure on the vehicle at said determined location; and controlling the vehicle to perform the regeneration procedure in dependence on the probability of completing the regeneration procedure.

This method provides the advantage of allowing the vehicle to base the decision on whether or not to initiate a regeneration procedure on the vehicle on the probability of the said procedure being successful in the present location. Unsuccessful regeneration procedures are undesirable as a failed regeneration wastes fuel unnecessarily and thus basing the decision to regenerate an aftertreatment device on a probability of success helps to reduce the number of unsuccessful regeneration attempts.

The method may comprise obtaining data related to the location of the vehicle from a remote server. The data obtained from the remote server may comprise a probability of the regeneration procedure on the vehicle completing successfully, in which case the probability of the regeneration procedure completing successfully is based on historical data comprising past regeneration data at the determined location.

To this end, the data received from the remote server relating to the location of the vehicle includes information that is relevant to the decision to be made. For example, the data may include an indication of traffic conditions or roadworks, which might slow the vehicle unexpectedly and therefore reduce the probability of completing a regeneration procedure that requires a steady speed.

The method may comprise transmitting the location of the vehicle to the remote server after the regeneration procedure on the vehicle has ended. In such embodiments, the method may comprise transmitting vehicle parameters to the remote server after the regeneration procedure on the vehicle has ended, the vehicle parameters including at least one of: the outcome of the regeneration procedure; the degradation of the aftertreatment device; the direction of travel; the type of vehicle; or a time stamp. Such methods may further comprise transmitting the location of the vehicle to the remote server prior to initiating the regeneration procedure, in which case the method may comprise transmitting vehicle parameters to the remote server prior to initiating the regeneration procedure, the vehicle parameters including at least one of: the degradation of the aftertreatment device; the direction of travel; the type of vehicle; a time stamp; or road traffic conditions.

In the above embodiments of the invention, the method may comprise monitoring vehicle parameters prior to transmitting the location of the vehicle to the remote server.

In some embodiments of the invention, the method comprises determining a predicted destination for the vehicle, and determining the probability of completing the regeneration procedure on the vehicle at said location in dependence on the predicted destination. Further or optionally, this method comprises determining a predicted route for the vehicle, and determining the probability of completing the regeneration procedure on the vehicle at said location in dependence on the predicted route. If the destination is within a certain distance, the regeneration may not have time to complete and if the route includes (for example) exit from a major road, the regeneration may not succeed.

According to another aspect of the invention, there is provided a control system for controlling a regeneration procedure in an exhaust system aftertreatment device on a vehicle, the control system comprising: a positioning module configured to determine a location of the vehicle; and a determining module configured to obtain data relating to the location of the vehicle and to determine a probability of completing the regeneration procedure on the vehicle at said location based on the obtained data. The control system initiates the regeneration procedure on the vehicle in dependence on the probability of completing the action.

The determining module may be configured to obtain data from a remote server, in which case the control system may be configured to transmit the vehicle location to the remote server at the end of a regeneration procedure. In such embodiments, the control system may be configured to transmit vehicle parameters to the remote server at the end of a regeneration procedure, the vehicle parameters including at least one of: the outcome of the regeneration procedure, the degradation of the aftertreatment device; the direction of travel; the type of vehicle; or a time stamp.

In some embodiments, the control system is configured to transmit the vehicle location to the remote server prior to initiating a regeneration procedure. In such embodiments, the control system may be configured to transmit vehicle parameters to the remote server prior to initiating a regeneration procedure, the vehicle parameters including at least one of: the degradation of the aftertreatment device; the direction of travel, the type of vehicle, a time stamp, or road traffic conditions.

The control system is configured to obtain data indicative of the probability of the regeneration procedure being successful from the remote server. The data obtained from the remote server may comprises a probability of the regeneration procedure on the vehicle completing successfully based on historical data comprising past regeneration data at the determined location. The control system may further be configured to determine a predicted destination for the vehicle, and to determine the probability of completing the regeneration procedure on the vehicle at said location in dependence on the predicted destination.

In another aspect, the invention also extends to a vehicle comprising the control system of the above aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In general terms, embodiments of the invention provide methods of predicting the probability of an action on a vehicle completing successfully. In each case, a vehicle is configured to receive information from a remote server that relates to the probability of a given action on the vehicle being successful, prior to initiating the action.

For example, the vehicle may receive information relating to the probability of a regeneration procedure on an aftertreatment device being successful when initiated at a given location. Based on this information, the vehicle may then determine whether it is appropriate to initiate the regeneration procedure or not. In another example, the remote server may provide the probability of finding a car parking space at various locations near to the vehicle's destination and based on this navigate the driver to the most suitable location.

Providing a means of determining the probability of an action completing successfully prior to initiating said action provides the advantage of increasing the success rate of actions on the vehicle, which in turn helps to improve fuel consumption, noting that many intermittent actions to be performed on a vehicle entail sub-optimal operation for a short period of time. Optimising the times at which vehicle actions are activated may also improve the driver's driving experience.

A specific embodiment of the invention will now be described, with numerous specific features discussed, to provide a thorough understanding of how the inventive concept as defined in the claims may be implemented in practice. However, it will be apparent to the skilled person that the invention may be put into effect in other ways and that in some instances well known methods, techniques and structures have been summarised to avoid obscuring the invention unnecessarily.

Figure 1:
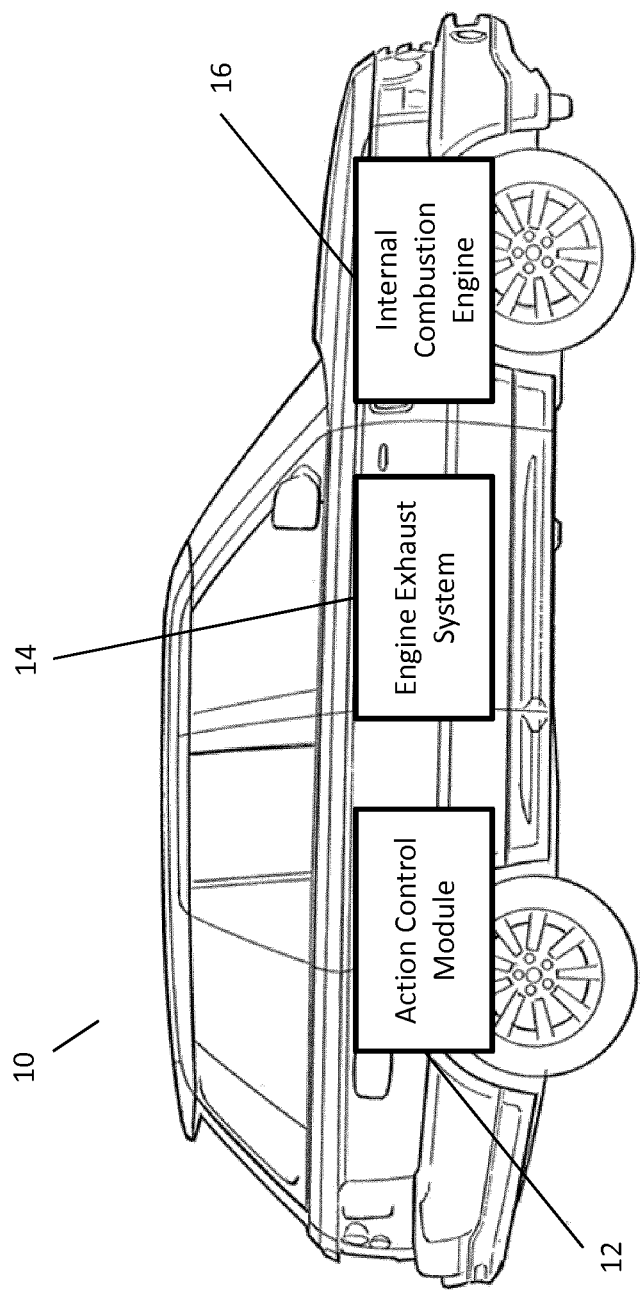
FIG. 1 shows a vehicle that is suitable for use with embodiments of the invention.

To place the embodiments of the invention in a suitable context, FIG. 1 illustrates schematically a vehicle 10 that is suitable for use with embodiments of the invention. The vehicle 10 contains an internal combustion engine 16, an engine exhaust system 14 including aftertreatment devices and a control system 12 which may be referred to as an action control module.

Figure 2:
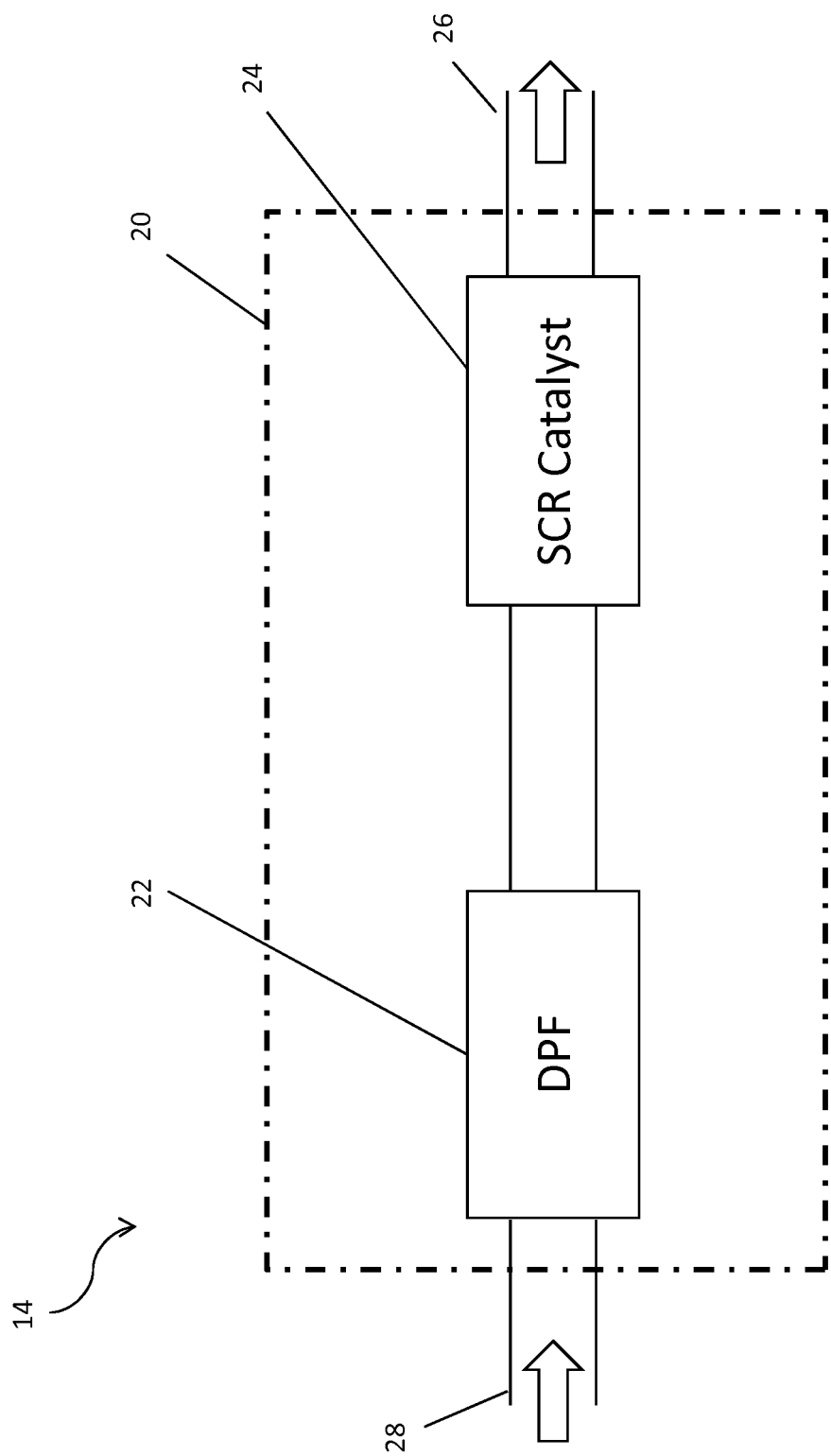
FIG. 2 shows schematically a known exhaust system for an internal combustion engine.

The engine exhaust system 14 is shown in further detail in FIG. 2, and includes an inlet 28 for receiving hot exhaust gases produced by the internal combustion engine 16 and an exhaust outlet 26 for expelling those exhaust gases to the atmosphere. The engine exhaust system 14 further includes a plurality of aftertreatment devices 20 disposed between the exhaust inlet 28 and the exhaust outlet 26. In the example shown in FIG. 2, the aftertreatment devices 20 include a diesel particulate filter 22 and an SCR Catalyst 24.

After prolonged use, the particulate filter 22 becomes saturated by particles collected from the exhaust gases. These particles are collectively referred to as 'soot', and include substances such as carbon monoxide, hydrocarbons and diesel particulate matter. The build-up of soot means that the particulate filter 22 requires regular maintenance to remain effective. Such maintenance is an example of a type of action that can be controlled using embodiments of the invention.

One type of maintenance is known as regeneration, in which the control system 12 applies certain conditions to the particulate filter 22 in order to safely dispose of accumulated soot. Regeneration requires a high exhaust gas temperature over a prolonged period, which is most likely to be achieved at a high constant cruising speed.

The engine 16 must burn more fuel during a regeneration operation to provide the required heat, and so regeneration reduces overall efficiency in the short-term. If regeneration is aborted early, the procedure must subsequently recommence from the start, meaning that the work done and the fuel consumed in the abortive operation is wasted.

In consequence, vehicles that are used primarily for short journeys at low speeds will rarely have the opportunity to regenerate the particulate filter 22, which will therefore become saturated and ineffective.

Figure 3:
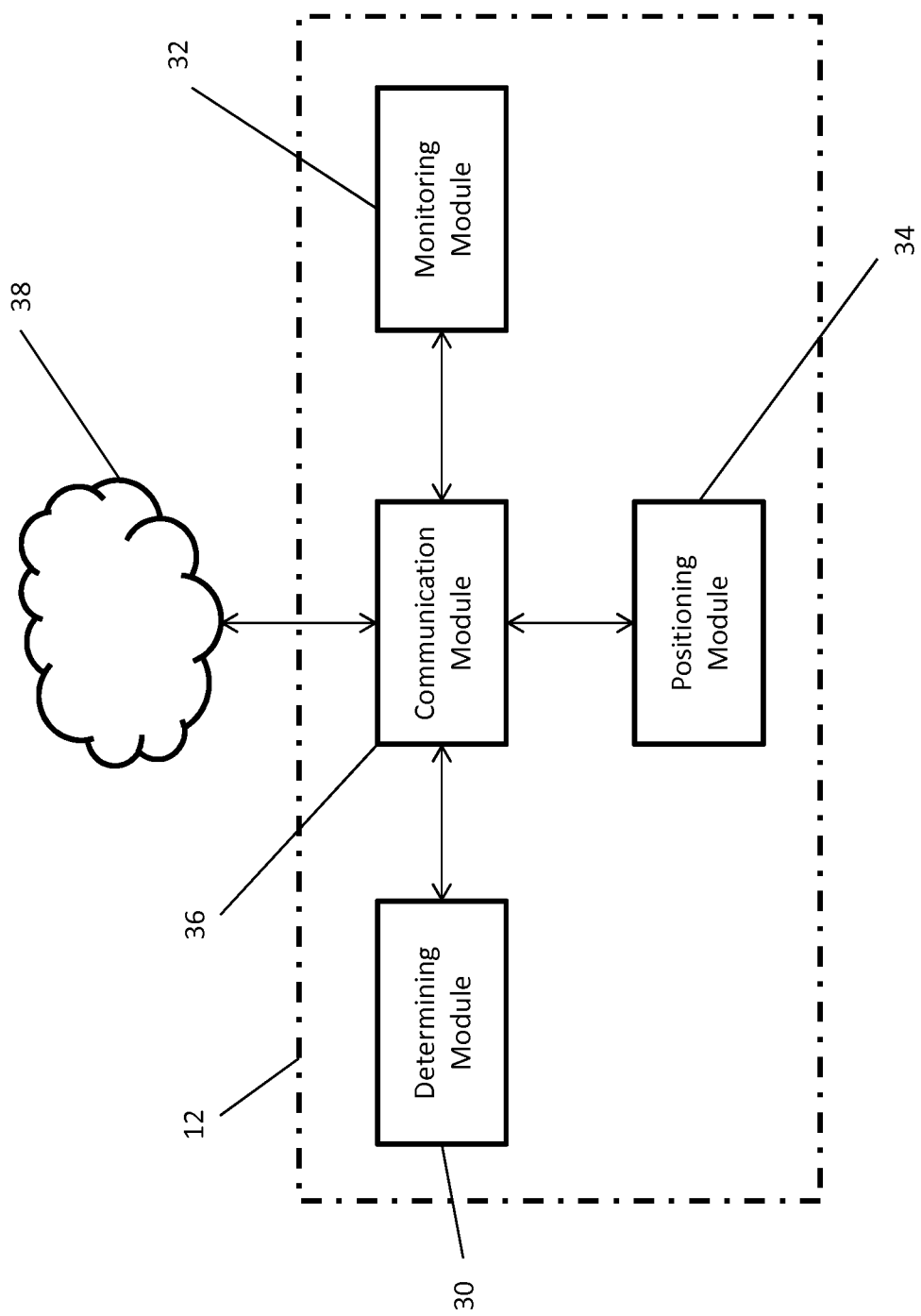
FIG. 3 is a block diagram of an architecture of an action control module of the vehicle of FIG. 1.

The control system 12 is shown in more detail in FIG. 3, which shows the control system 12 in communication with a remote server 38. As shown, the control system 12 comprises a monitoring module 32, a communication module 36, a positioning module 34 and a determining module 30.

The monitoring module 32 is configured to monitor vehicle parameters such as the status of the aftertreatment devices 20 within the engine exhaust system 14, to ensure the levels of accumulated soot within each device remain acceptable. The monitoring module 32 calculates a value representative of the soot built up within the aftertreatment devices 20. This is typically represented as percentage of degradation of each aftertreatment device 20, where the percentage degradation increases over time during the operation of the vehicle 10. When the percentage degradation reaches a critical level, for example 80% degradation, the aftertreatment device 20 is subjected to a regeneration procedure, which burns off the unwanted soot from within the aftertreatment device 20.

The monitoring module 32 can be configured to monitor other systems within a vehicle 10 that require monitoring. For example, the monitoring module 32 could be configured to monitor an energy recovery system within a hybrid vehicle to enable a determination of the optimal moment at which to switch between use of an electric motor and an internal combustion engine as a source of drive for the vehicle 10.

In a further example, the monitoring module 32 could be used to monitor a $NO_x$ storage catalyst aftertreatment device, which absorbs oxides of nitrogen ($NO_x$) from the engine exhaust emissions in particular operating conditions. The device has a limited capacity and requires the engine to run in a particular operating mode (a regeneration process) to allow chemical conversion of $NO_x$ to other more benign gas species (such as $N_2$ and $O_2$). This regeneration requires the engine 16 to operate in a rich mode (a low oxygen combustion mode) which enables the chemical conversion. $NO_x$ storage catalyst regeneration generally requires stable operating conditions without rapid changes in driver input. The benefit of the cloud based data analysis in this scenario is that it would identify areas where $NO_x$ storage catalyst regeneration is likely to occur successfully.

In another example, the monitoring module 32 may monitor the driver's predicted destination as well as the availability of parking spaces close to the predicted destination.

The communication module 36 within the control system 12 communicates with a networked computing device over a mobile network such as 3G or 4G. The networked computing device is typically a remote server 38. The communication module 36 transmits information indicative of parameters on the vehicle 10 to the remote server 38, and in turn receives data from the remote server 38 relating to, for example, traffic congestion on a road on which the vehicle 10 is presently located, or vehicle systems. The communication module 36 may be a dedicated communication module 36 for the control system 12 or may alternatively be a common communication module 36 that is shared with other communication requirements of the vehicle.

The control system 12 contains a positioning module 34 as shown in FIG. 3. The positioning module 34 determines the location of the vehicle 10, as well as its speed and direction of travel at any given time. The positioning module 34 uses a system, such as global positioning system (GPS) and/or satellite navigation system, to determine the location and optionally the route of the vehicle 10. The positioning module 34 may also be used to provide information (e.g. vehicle position) to a satellite navigation system within the vehicle 10. The positioning module 34 is configured to provide an output indicative of the vehicle's location, and optionally route, to the communication module 36. The output can in turn be transmitted to the remote server 38, or provided to either of the determining or monitoring modules.

The remote server 38 shown in FIG. 3 can communicate with any vehicles that are equipped with a control system 12 including a communication module 36 as described above. The remote server 38 stores data received from those vehicles, the data being indicative of vehicle parameters and including the location at which the data was captured. The remote server 38 compiles the received data into a database of location-indexed historical vehicle data, or 'map data'. This database can be used to determine the probability of vehicle actions such as regenerating an aftertreatment device 20 completing if the action is initiated at a given location.

In use, the vehicle 10 transmits its location and its direction of travel to the remote server 38 prior to initiating an action, and the remote server 38 transmits back an indication of the probability of the action completing successfully if initiated at the said location.

Storing the map data remotely reduces the memory requirements of the control system 12. It also provides the advantage of being able to constantly update the map data in order to provide as accurate a probability estimate as possible.

The determining module 30, within the control system 12 as shown in FIG. 3, is configured to determine whether it is appropriate to initiate an action on the vehicle 10 based on the probability of completing that action successfully as indicated by the remote server 38. When the determining module 30 determines that it is appropriate to initiate an action on the vehicle 10, it outputs a signal to the appropriate vehicle system, for example to the aftertreatment device 20 in the present example, which will initiate the regeneration procedure of the aftertreatment device 20.

The decision to initiate an action will be made not only based on the prospects of success, but also taking into account the present level of need to perform the action. For example, for regeneration of an aftertreatment device 20, the determining module 30 determines whether it is appropriate to initiate a regeneration process based on a coefficient representative of the degradation of the aftertreatment device 20, which is typically expressed as a percentage.

The determining module 30 and optionally also the monitoring module 32 may comprise one or more electronic controllers having a memory means associated therewith containing instructions so that when a processor of the one or more electronic controller accesses the memory means and executes the instructions stored thereon it operates to carry out the functions described herein above.

Figure 4:
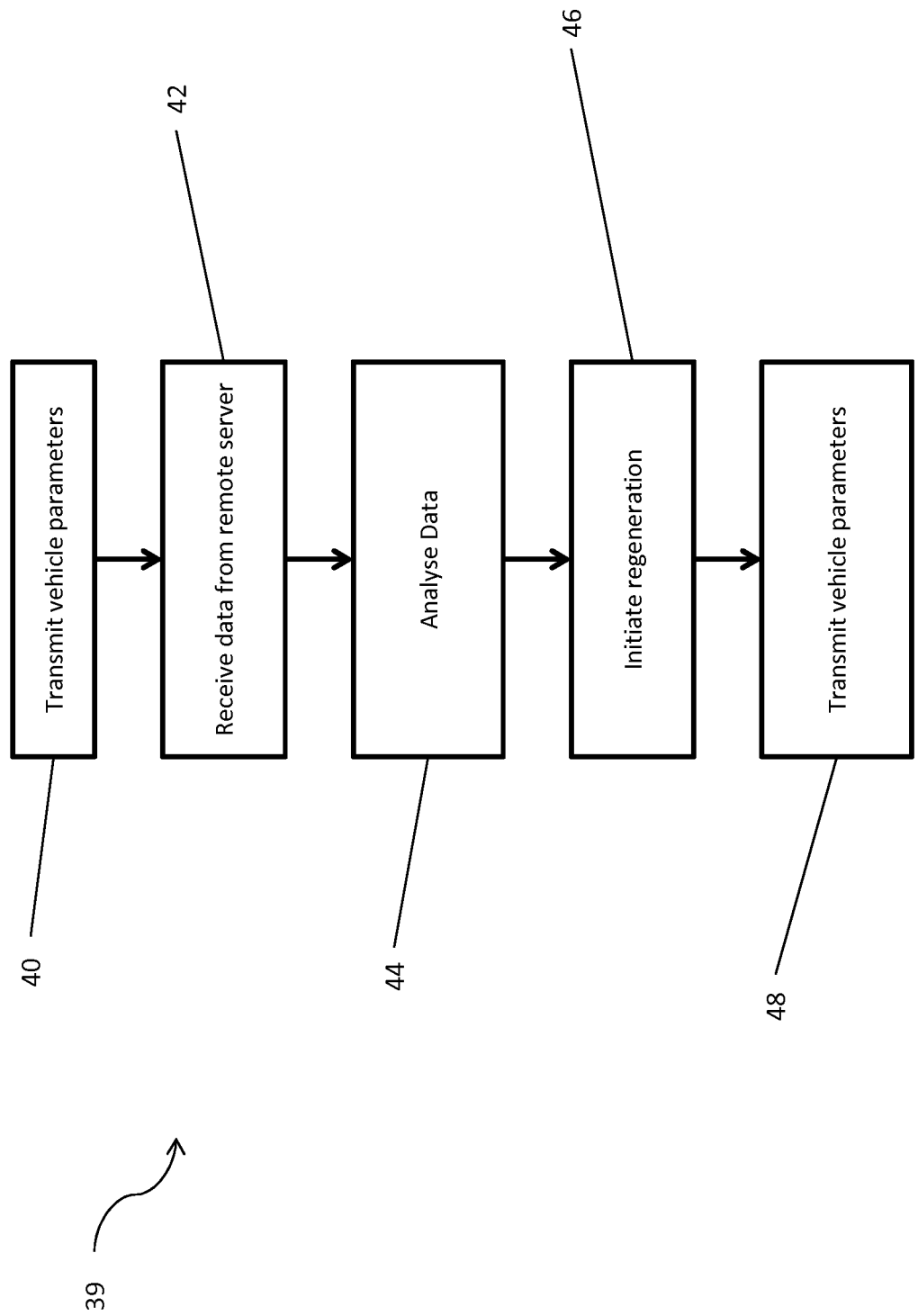
FIG. 4 is a block diagram illustrating the steps followed by the action control module of FIG. 3 during a regeneration procedure.

FIG. 4 illustrates a process 39 that the control system 12 follows when the aftertreatment device 20 requires regenerating. The control system 12 transmits the location of the vehicle 10 along with other vehicle parameters, such as a predicted destination, to the remote server 38 as part of a first step 40. The remote server 38 then processes the data received from the vehicle 10 and transmits the probability of a regeneration action being successful at the vehicle's current location, as part of the second step 42. The remote server 38 may also suggest other potentially more suitable locations for performing the action.

Next, the determining module 30 compares the statistical data received from the remote server 38 with the percentage of degradation within the aftertreatment device 20 as part of the third step 44. The fourth step 46 is to initiate the regeneration procedure if the determining module 30 determines it is appropriate to do so and the fifth step 48 is to transmit the location at which the regeneration procedure was completed to the remote server 38, along with other vehicle parameters, such as information as to whether the regeneration procedure was successful. The remote server 38 will update the database with the result of the regeneration attempt in order to keep the database up-to-date with the most relevant data.

Figure 5:
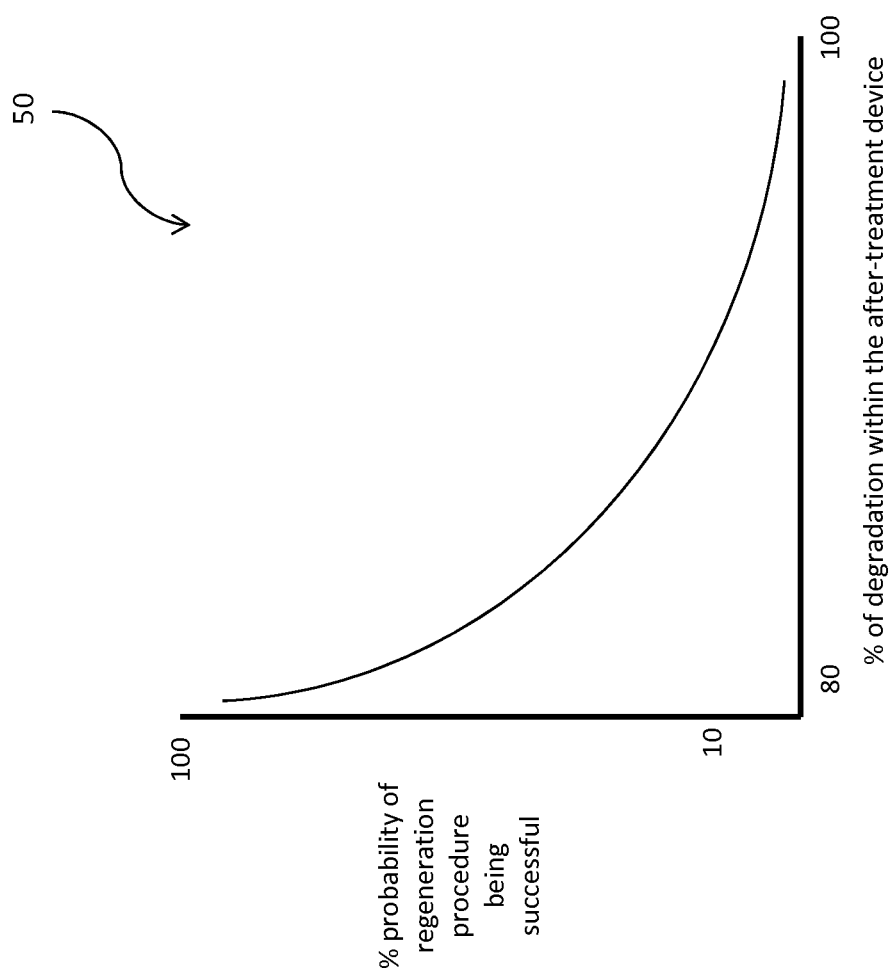
FIG. 5 is a graph showing the probability for a successful regeneration procedure with respect to the percentage of degradation of an aftertreatment device.

The determining module 30 compares the probability of a regeneration being successful with the percentage of degradation within the aftertreatment device 20 in order to determine whether it is appropriate to initiate a regeneration procedure or not. FIG. 5 illustrates this graphically, and shows the critical probability of success at which a regeneration procedure will be attempted with reference to the percentage degradation of the aftertreatment device 20. The scales have been included as an example only. FIG. 5 demonstrates the decision made by the determining module 30, if the degradation is above a threshold (for example 80%) the determining module 30 will command a regeneration of the aftertreatment device 20 but only if the probability received from the remote server 38 is very high (for example >90%). As the aftertreatment device becomes more and more degraded beyond the threshold over time, the determining module 30 becomes less selective, opting to regenerate the aftertreatment device 20 at a lower and lower probability of success. This is shown by the curve on the graph 50 but this curve could be different depending on calibration.

The probability of a successful regeneration procedure is generated when data sent to the remote server 38. Every time a regeneration is attempted, location and outcome data of the attempt is transmitted to the remote server 38, when more than one regeneration attempt has been made at the same location then a percentage is generated, the more attempts, the more accurate the likelihood.

Further data could be transmitted to the remote server 38 including; vehicle direction data, vehicle speed data, road type data, time of day data, traffic data, regeneration duration data, etc. or any data that could further refine the likelihood of success of a future regeneration attempt. For example, if an attempt has failed because of adverse traffic conditions at a location that has a high probability of success, information about the adverse traffic conditions could help to refine the probability at that location only during those conditions.

As a further example, if the aftertreatment device 20 is at a relatively low degradation level and the probability of a successful regeneration is also low, the determining module 30 would not initiate a regeneration procedure in a bid to avoid wasting fuel. However, if the aftertreatment device 20 is at a high level of degradation, meaning that regeneration is urgent, then the determining module 30 would initiate a regeneration procedure even when the probability of success is relatively low.

The determining module 30 receives a probability of a successful regeneration taking place at a given location from the remote server 38 and compares it to the graph 50 shown in FIG. 5. If the probability is above the threshold then the determining module 30 will issue a control signal to trigger a regeneration action.

However, to prevent repeated failed regeneration attempts resulting from a regeneration procedure being initiated close to the vehicle's destination, the determining module 30 may further consider the predicted destination of the vehicle 10. The predicted destination may be input to the determining module 30 via a satellite navigation system. If no destination information is available in this manner, the determining module 30 may predict the destination of the vehicle 10 based on, for example, the time of day and previous usage patterns of the vehicle 10.

Over time, the determining module 30 may learn locations where successful regenerations have occurred. In this example, the determining module 30 learns usage patterns of the vehicle 10 and also learns where previous regeneration procedures were successful. When the control system 12 receives map data from the remote server 38 indicative of a location for a regeneration procedure, the determining module 30 will compare this with the vehicle's destination and past regeneration data to determine whether it is appropriate to initiate a regeneration procedure.

Figure 6:
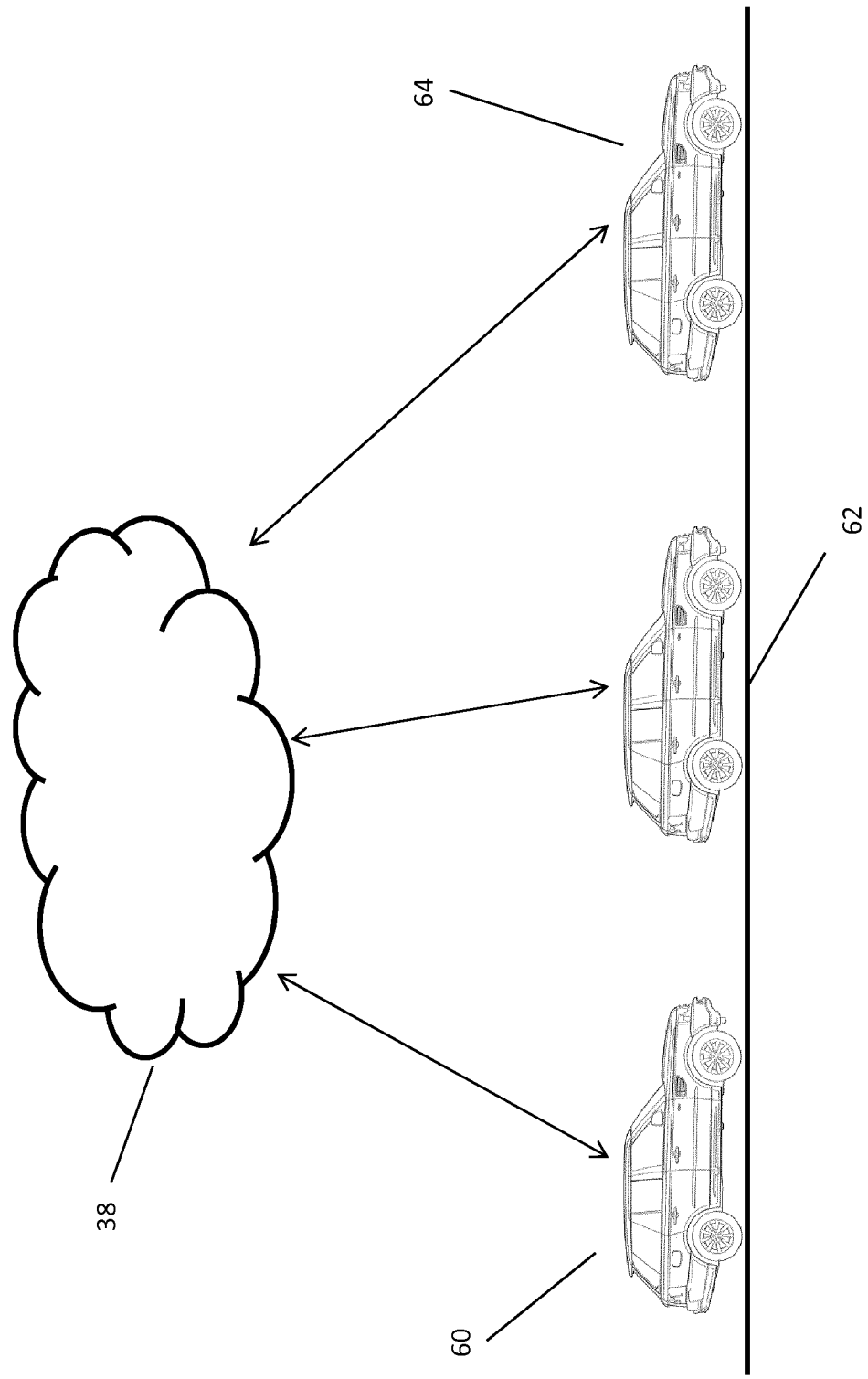
FIG. 6 shows the vehicle of FIG. 1 communicating with a remote computing network in a series of locations.

Particulate filter regeneration typically requires a three-stage process, where each step is taken at a different stage in a vehicle's journey as shown in FIG. 6. The first step 60 involves determining an optimal point to commence regeneration, the second step 62 involves initiating the regeneration procedure and transmitting the start location along with other vehicle parameters to the remote server 38 and at the third step 64 the vehicle 10 exits regeneration and transmits vehicle parameters including location and outcome of the regeneration to the remote server 38.

The first stage 60 involves determining whether road conditions are suitable for regeneration. Regeneration typically requires steady state, high load conditions such as motorway driving. The control system 12 sends the location and direction of travel of the vehicle 10 to the remote server 38. The remote server 38 analyses this data and transmits back a location, based on map data stored on the remote server 38, within the path of the vehicle 10 at which the probability of commencing a successful regeneration is relatively high.

The determining module 30 compares the probability of success against the percentage of degradation of the aftertreatment device 20, as shown in FIG. 5, and determines whether it is appropriate to initiate regeneration at that time. When the vehicle 10 reaches the location determined to be suitable for regeneration, the positioning module 34 sends information regarding the location where regeneration commenced to the remote server 38. In an embodiment of the invention the positioning module 34 further determines a predicted route and destination of the vehicle 10 which is transmitted to the remote server 38 and this information may then be used to determine a more suitable location for regeneration.

The second stage 62 involves conditioning the components within the vehicle 10 for regeneration to take place. The control system 12 operates the engine 16 in a manner that combusts more fuel to increase the temperature of exhaust gases exiting the engine 16, and in turn the components within the engine exhaust system 14. The overall procedure can take up to twenty minutes depending on the type of aftertreatment device 20 that is being regenerated. Due to the length of time and the load conditions required for a regeneration procedure to complete successfully, the regeneration does not always complete, which wastes fuel.

The third stage 64 involves, upon completion of the regeneration procedure, transmitting information to the remote server 38 indicative of whether the regeneration procedure was successful or not. The database on the remote server 38 is updated with the result of the regeneration attempt, to improve the accuracy of future probability estimates.

During a regeneration process the vehicle 10 may transmit other parameters of the vehicle 10 to the remote server 38, which are then stored within the remote server 38. The vehicle parameters may include, for example, the location at the start of the action, the direction the vehicle 10 is travelling in, the vehicle speed, the outcome of the action (was it successful or not), the type of action, the type of vehicle, the time of the action and the location at the end of the action. The skilled person will appreciate that this list is not exhaustive and that other vehicle parameters could be sent to the remote server 38 depending on the action.

Over time the remote server 38 builds up a database of locations where actions were initiated and whether or not the said action was successful. Each data set associated with an action that is stored on the remote server is allocated a plurality of data tags. The data tags allow the data to be sorted within the database into a number of different areas.

At the highest level, each set of data associated with an action is tagged successful or unsuccessful. This allows the remote server 38 to create a database of map locations at which actions were started and whether or not the procedures were successful. The remote server 38 then calculates the probability of a future action being successful when started at a given location based on historical data stored within the database.

Further tags are added to each data set in order to differentiate between, for example, the type of vehicle, type of aftertreatment device, time of day, traffic conditions, weather conditions, vehicle destination and action type. Tagging the data in this way improves the accuracy of the probability of a successful action and allows the remote server 38 to differentiate between data sets in order to only consider the data sets that are deemed to be relevant to a given vehicle at a particular time. This ensures that only the most relevant map data is provided to the vehicle.

For example, in light traffic conditions a section of motorway may be suitable for an action to complete, but in heavy traffic conditions the probability of success may be relatively low. As a result the remote server 38 would consider the traffic conditions and base the probability estimate provided to the vehicle 10 only on data tagged with the same traffic levels.

To improve the accuracy of the estimated success probabilities provided to vehicles 10 by the remote server 38, sets of data may be grouped based on location. Geo-fences, namely a defined geographical area, may be set up on sections of road and the geo-fenced area may be given a probability of successful regeneration. For example, in certain road conditions, such as a motorway, a geo-fence may encompass a large section of road as it can be assumed that the driving conditions are uniform along the entire section of road. However, in urban conditions the geo-fenced areas may be much smaller as road conditions within an urban environment are far more variable. Geo-fencing the data sets on the remote server 38 provides the advantage of basing the estimated probability on a larger data set deemed to be relevant to a stretch of road.

In an embodiment of the invention the remote server 38 will store a usage pattern for the vehicle 10. When the vehicle 10 uploads vehicle parameters to the remote server 38 this information may be fitted with a tag that is unique to the vehicle 10. When the remote server 38 determines the probability of a successful regeneration taking place the remote server 38 will consider the map data from all relevant vehicle actions as well as map data from that vehicle 10 only. This allows the remote server 38 to provide a unique predicted probability of a successful action taking place that is tailored to each vehicle 10 based on at least location, predicted destination and historical usage patterns.

Many modifications may be made to the above examples without departing from the scope of the present invention as defined in the accompanying claims.

The invention claimed is:

1. A method for controlling a regeneration procedure in an exhaust system aftertreatment device in a vehicle, the method comprising:
   determining a location of the vehicle;
   obtaining data related to the location of the vehicle from a remote server;
   determining, based on the data related to the location, a probability of completing the regeneration procedure on the vehicle at said determined location; and
   controlling the vehicle to perform the regeneration procedure based at least in part on the probability of completing the regeneration procedure;
   wherein the data obtained from the remote server comprises a probability of the regeneration procedure on the vehicle completing successfully based on historical data comprising past regeneration data at the determined location.

2. The method as claimed in claim 1, further comprising transmitting the location of the vehicle to the remote server after the regeneration procedure on the vehicle has ended.

3. The method as claimed in claim 2, further comprising transmitting vehicle parameters to the remote server after the regeneration procedure on the vehicle has ended, the vehicle parameters including at least one selected from a group consisting of:
   the outcome of the regeneration procedure; the degradation of the aftertreatment device;
   the direction of travel; the type of vehicle; and a time stamp.

4. The method as claimed in claim 2, further comprising monitoring the condition of the exhaust system aftertreatment device prior to transmitting the location of the vehicle to the remote server.

5. The method as claimed in claim 1, further comprising transmitting the location of the vehicle to the remote server prior to initiating the regeneration procedure.

6. The method as claimed in claim 5, further comprising transmitting vehicle parameters to the remote server prior to initiating the regeneration procedure, the vehicle parameters including at least one selected from a group consisting of: the direction of travel; the degradation of the aftertreatment device; the type of vehicle; a time stamp; and road traffic conditions.

7. The method of claim 1, further comprising:
   determining a predicted destination for the vehicle; and
   determining the probability of completing the regeneration procedure on the vehicle at said location based at least in part on the predicted destination.

8. The method of claim 1, further comprising:
   determining a predicted route for the vehicle; and
   determining the probability of completing the regeneration procedure on the vehicle at said location based at least in part on the predicted route.

9. A control system for controlling a regeneration procedure in an exhaust system aftertreatment device on a vehicle, the control system comprising:
- a positioning module configured to determine a location of the vehicle; and
- a determining module configured to obtain data from a remote server relating to the location of the vehicle and to determine a probability of completing the regeneration procedure on the vehicle at said location based on the obtained data;
- wherein the control system initiates the regeneration procedure on the vehicle based at least in part on the probability of completing the action; and
- wherein the data obtained from the remote server comprises a probability of the regeneration procedure on the vehicle completing successfully based on historical data comprising past regeneration data at the determined location.

10. The control system of claim 9, wherein the control system is further configured to transmit the vehicle location to the remote server at the end of a regeneration procedure.

11. The control system of claim 10, wherein the control system is further configured to transmit vehicle parameters to the remote server at the end of a regeneration procedure, the vehicle parameters including at least one selected from a group consisting of: the outcome of the regeneration procedure; the degradation of the aftertreatment device; the direction of travel; the type of vehicle; and a time stamp.

12. The control system of claim 9, wherein the control system is further configured to transmit the vehicle location to the remote server prior to initiating a regeneration procedure.

13. The control system of claim 12, wherein the control system is further configured to transmit vehicle parameters to the remote server prior to initiating a regeneration procedure, the vehicle parameters including at least one selected from a group consisting of: the degradation of the aftertreatment device; the direction of travel; the type of vehicle; a time stamp; and road traffic conditions.

14. The control system of claim 9, wherein the control system is further configured to determine a predicted destination for the vehicle, and also to determine the probability of completing the regeneration procedure on the vehicle at said location based at least in part on the predicted destination.

15. A vehicle comprising a control system according to claim 9.

* * * * *